United States Patent

Yoshii et al.

[11] Patent Number: 5,637,416
[45] Date of Patent: Jun. 10, 1997

[54] CYLINDRICAL BATTERY

[75] Inventors: Fumihiko Yoshii, Neyagawa; Hitoshi Mikuriya, Chigasaki; Kaoru Okinaga, Fujisawa; Katsuhiro Okamoto, Toyohashi; Masaru Watanabe, Nishinomiya, all of Japan

[73] Assignee: Matsushita Electric Industrial Co., Ltd., Osaka, Japan

[21] Appl. No.: 618,644

[22] Filed: Mar. 19, 1996

[30] Foreign Application Priority Data

May 9, 1995 [JP] Japan ................................. 7-110442
Oct. 12, 1995 [JP] Japan ................................. 7-263758

[51] Int. Cl.$^6$ ................................................. H01M 6/10
[52] U.S. Cl. ................................................. 429/94; 429/223
[58] Field of Search ................................. 429/94, 223, 218, 429/243, 241, 233; 420/900; 75/415

[56] References Cited

U.S. PATENT DOCUMENTS

| | | | |
|---|---|---|---|
| 3,314,821 | 4/1967 | Lambert et al. | 429/209 X |
| 4,251,603 | 2/1981 | Matsumoto et al. | 429/94 |
| 5,487,961 | 1/1996 | Straungways et al. | 429/223 |
| 5,542,958 | 8/1996 | Furukawa | 429/94 X |

FOREIGN PATENT DOCUMENTS

| | | |
|---|---|---|
| 55-108182 | 8/1980 | Japan . |
| 58-161251 | 9/1983 | Japan . |
| 59-207560 | 11/1984 | Japan . |
| 60-133655 | 7/1985 | Japan . |
| 62-139256 | 6/1987 | Japan . |
| 63-81767 | 4/1988 | Japan . |
| 5-41211 | 2/1993 | Japan . |
| 94013025 | 6/1994 | WIPO . |

*Primary Examiner*—Anthony Skapars
*Attorney, Agent, or Firm*—Panitch Schwarze Jacobs & Nadel, P.C.

[57] ABSTRACT

A cylindrical battery having a high utilization rate and a high discharge capacity rate is disclosed. It has an electrode group configured by rolling up two sheet electrodes of opposite polarity in spiral fashion interposing a separator therebetween, wherein one of the electrodes is provided with a porous metal substrate having a higher porosity layer and a lower porosity layer which has a considerably smaller thickness than that of the higher porosity layer, and an active material filled substantially in the spaces of the higher porosity layer of the porous metal substrate.

10 Claims, 5 Drawing Sheets

5,637,416

CYLINDRICAL BATTERY

BACKGROUND OF THE INVENTION

1. Field of the Invention

The present invention relates to a cylindrical battery with a spirally rolled-up electrode assembly, particularly an improvement in the electrode plate for an alkaline storage battery.

2. Description of the Prior Art

Electrodes for a battery are roughly classified into three general groups: a paste-type electrode, a sintered-type electrode and a pocket-type electrode. Recently, as a new method for fabricating the nickel electrode for the alkaline storage batteries, a method for fabricating the paste-type electrode has been put to practical use and is now frequently used. The method comprises filling a pasty mixture (hereinafter, referred to as "paste") composed essentially of an active material powder into spaces formed in a porous substrate such as a foamed metal or a nonwoven fabric of nickel fibers having three-dimensional communicating spaces.

Since such porous metal substrates have a porosity, i.e., a proportion occupied by the spaces to the total substrate, of as high as 95%, and the spaces have a maximum diameter of several hundreds μm, it is possible to directly fill the active material powder or the paste into the spaces. As a result, these metal substrates can be finished into electrodes in a simple process.

Such porous metal substrate is useful when producing an electrode of high capacity density, by taking advantage of its high porosity for filling the active material into the spaces of the substrate or for supporting the active material on the surfaces of the substrate. The active material, however, has poor conductivity in general, and thus, an additive such as cobalt compound or the like is used in order to improve the utilization rate (the ratio of actual discharge capacity to the theoretical capacity) and the discharge capacity characteristics.

In spite of the above-mentioned conventional cobalt compound additives, it is still desired to improve the electrode to have a higher capacity from the practical point of view, and various additives are under study at the present time.

SUMMARY OF THE INVENTION

The primary object of the present invention is to provide a cylindrical battery of high capacity, by improving an electrode which employs a porous metal substrate having three-dimensional communicating spaces.

According to the present invention, a cylindrical battery is obtained provided with an electrode group configured by rolling up two sheet electrodes of opposite polarity in spiral fashion, with a separator interposed therebetween, wherein at least one of the electrodes comprises:

(a) a sheet of porous metal substrate having three-dimensional communicating spaces for including an active material defined by a first principal face and a second principal face which faces inward when the electrode group is rolled up, wherein the substrate has a higher porosity layer connected to the first principal face, and a lower porosity layer connected to the second principal face and having a considerably smaller thickness than that of the higher porosity layer, and (b) the active material filled substantially in the spaces of the higher porosity layer.

The present invention also provides a cylindrical battery having an electrode group configured by rolling up the electrodes in spiral fashion as mentioned above, except that the second principal face of one of the electrodes faces outward.

The present invention further provides a cylindrical battery comprising an electrode group configured by rolling up the electrodes, wherein one of the electrodes is provided on its second principal face with a plurality of grooves or cut-lines which are parallel with an axis of the rolled-up electrode group and wherein the second principal face faces inward or outward.

In a preferred embodiment of the present invention, one of the electrodes is a nickel electrode containing an active material of nickel hydroxide, and the other electrode is a negative electrode comprising a porous substrate such as perforated metal sheet or the like and an active material mixture consisting mainly of hydrogen storage alloy powder supported by the porous substrate.

In the above-mentioned cylindrical battery, one face of one of the electrodes is preferably not covered with the active material.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
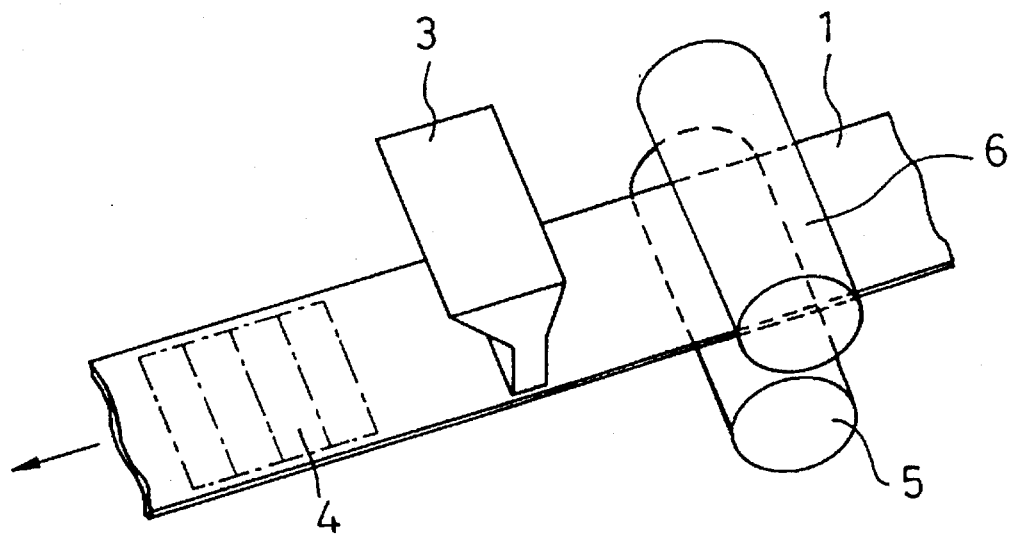
FIG. 1 is a schematic perspective view showing a process for fabricating an electrode in accordance with the present invention.

As mentioned previously, the present invention is directed to a cylindrical battery wherein one of the electrodes comprises a porous metal substrate having a higher porosity layer and a lower porosity layer which has a considerably smaller thickness than that of the higher porosity layer and an active material is filled substantially in the spaces of the higher porosity layer of the porous metal substrate.

In the above-mentioned electrode, it is preferable that the lower porosity layer is not substantially filled with the active material, and in particular, the second principal face connected to the lower porosity layer is not covered with the active material. The proportion of the metal occupying the layer is higher for the lower porosity layer than the higher porosity layer, and thus the former has larger conductivity. Since the presence of the lower porosity layer is effective to increase the conductivity of the electrode, the utilization rate and the discharge capacity of the battery are improved.

In addition, when the spirally rolled-up electrode group is configured by rolling up the electrode plates so that the lower porosity layer of the electrode faces inward, in other words, the layer is directed toward the center of the electrode group, the distance between one electrode and the other electrode, whose outermost periphery contacts the battery housing, is made substantially small. As a result, the utilization rate of the active material and the discharge capacity rate are improved.

When a plurality of grooves are provided on the higher porosity layer filled with the active material, i.e., on the side which tends to come outward when the electrodes are rolled up, in perpendicular to the direction of rolling up (in parallel with an axis of the rolled-up electrode group), the electrode plate is made easy to bend, thereby to make the electrode easy to be rolled up in spiral fashion. As a result, the area for the electrode reaction substantially increases, thereby to improve the utilization rate and the discharge capacity rate.

On the contrary, if the spirally rolled-up electrode group is configured by rolling up the electrode plates so that the lower porosity layer of one of the electrodes faces outward, in other words, the layer is directed toward the periphery of the electrode group, the conductivity of the electrode is also improved because of the presence of the lower porosity layer, and the utilization rate and the discharge capacity rate are improved.

When one of the electrodes is rolled up so that its lower porosity layer faces outward or inward and a plurality of grooves are provided on the side of the lower porosity layer in perpendicular to the direction of rolling up, the electrode plate is made easy to bend, and it becomes easy to roll up the electrode group in a cylindrical shape, with a cross-section approximately to a true circle. As a result, the efficiency of the electrode reaction increases, the utilization rate of the active material and the discharge capacity rate are improved.

In the following paragraphs, the present invention will be described more specifically with reference to its preferred embodiments.

EXAMPLE 1

A paste was prepared by adding 10 parts by weight of nickel metal powder having a particle diameter of about 2–3 μm and 5 parts by weight of cobalt oxide powder having a particle diameter of about 2–3 μm to 100 parts by weight of nickel hydroxide having an average particle diameter of 10 μm, in their powder state, then adding water as a dispersing medium to the obtained mixture so that the proportion of the water in the whole paste was made 20% by weight and thereafter kneading the added mixture.

FIG. 1 schematically shows a mode of fabricating an electrode in accordance with the present invention. In FIG. 1, a spouting nozzle 3 was so provided that it faced one face of a belt-like foamed porous nickel substrate 1 having a width of 100 mm, a thickness of 2.5 mm, a porosity of 98% and a mean pore size of 200 μm corresponding to the size of its three-dimensional communicating spaces. And, the paste prepared in the above-mentioned manner was allowed to spout out through this nozzle 3, to be filled into the three-dimensional communicating spaces of the porous nickel substrate 1, while transferring the porous nickel substrate along its longitudinal direction. In this figure, numerals 5 and 6 designate rollers for transferring the porous nickel substrate.

During the filling process, a distance between the nib of the nozzle 3 and the porous metal substrate 1 was kept at 0.1 mm, and the amount of the paste spouting out through the nozzle 3 was maintained at a rate of 30–33 g/second. When filling the paste into the spaces of the porous nickel substrate, the transferring speed of the porous nickel substrate was so regulated as to allow the paste to penetrate the spaces from its one face of the porous metal substrate but not to reach up to the other face of the porous metal substrate 1. More specifically, the filling process was regulated in terms of the transferring speed of the porous nickel substrate so as to allow the paste to penetrate the spaces up to a part which corresponds to about 80% of the thickness of the porous metal substrate but not to reach the remaining 20% of the porous metal substrate. As a result, it was found that a preferable transferring speed of the porous metal substrate was 7 m/minute, Although omitted in FIG. 1 for brevity, a belt or rotor for supporting the porous metal substrate was provided on the other face of the porous metal substrate 1 in order to maintain the distance between the nib of the nozzle 3 and the porous metal substrate 1 constant, even when a pressure was exerted on the porous metal substrate by an action of the spouted paste.

The porous metal substrate thus filled with the paste was then pressed to reduce its thickness to 1.0 mm. By this pressing process, the three-dimensional communicating spaces of the porous metal substrate were filled with the paste substantially completely. On the side of the face which had not faced the nozzle, the spaces of the porous metal substrate were crushed and narrowed, and the porosity of the porous metal substrate was reduced. As a result, the proportion of the metal structure occupying the substrate was increased. The paste was not allowed to project from the surface of that side or to expose itself on the surface.

The above-mentioned porous metal substrate 1 filled with the paste was then cut into a rectangular sheet having a width of 35 mm and a length of 87 mm as indicated by the dot-dashed line in FIG. 1. A lead conductor was spot-welded on a predetermined point of the cut rectangular sheet 4 to produce an electrode plate "a". The amount of the active material filled in the electrode plate "a" ranged from 9 to 10 grams.

An electrode group was assembled by spirally rolling up the electrode "a" produced in the above-mentioned manner as the positive electrode, a known nonwoven fabric separator of polypropylene and a known metal hydride negative electrode of a hydrogen storage alloy comprising misch metal and nickel, interposing the separator between both electrodes. When assembling the electrode group, the electrodes and separator were rolled up so that the face of the electrode "a" which had not been filled with the active material faced inward, and a part of the negative electrode occupied the outermost periphery. The assembled electrode group was then inserted into a cylindrical battery housing. A predetermined amount (2 ml) of an alkaline electrolyte was injected into the housing enclosing the electrode group, and an open end of the housing was sealed with a sealing disk, to prepare a cylindrical nickel-metal hydride storage battery A of 4/5 A size as shown in FIG. 3.

Figure 3:
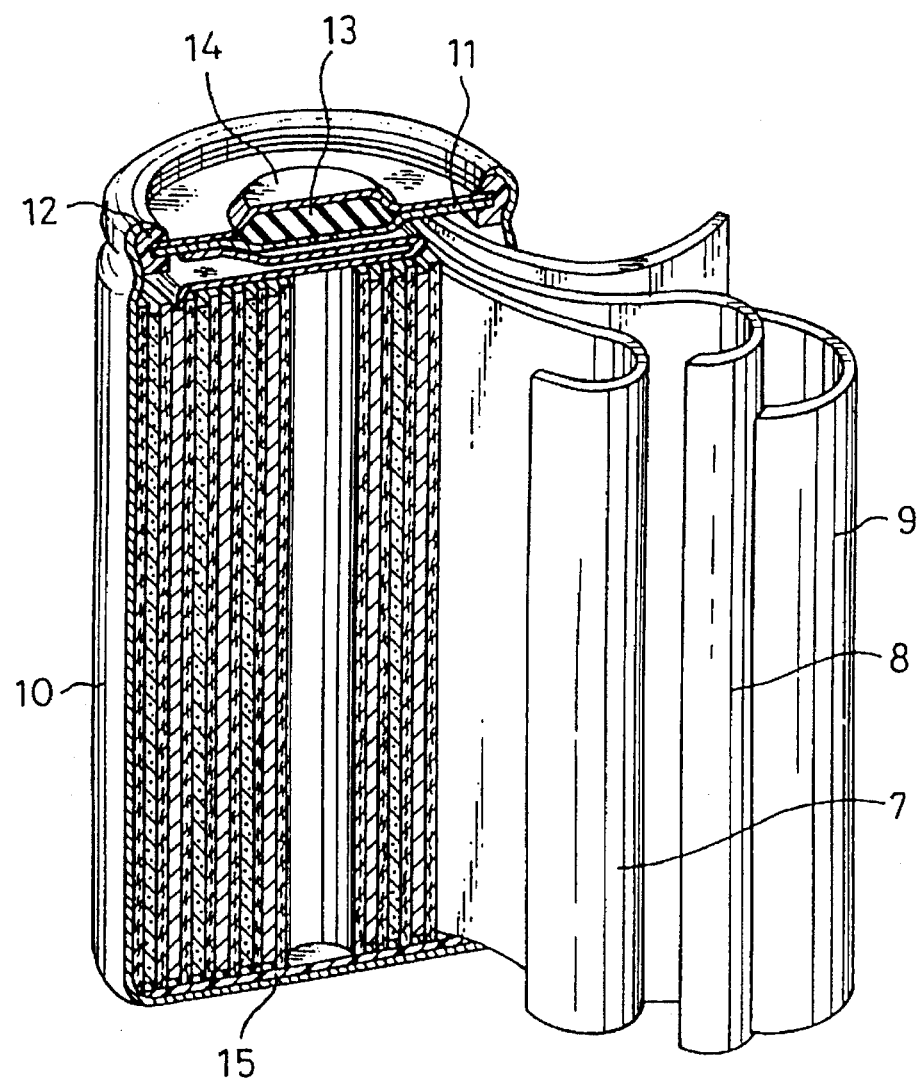
FIG. 3 is a partly cut-out perspective view showing the state wherein the electrodes are extracted from an example of a cylindrical battery in accordance with the present invention.
Figure 4:
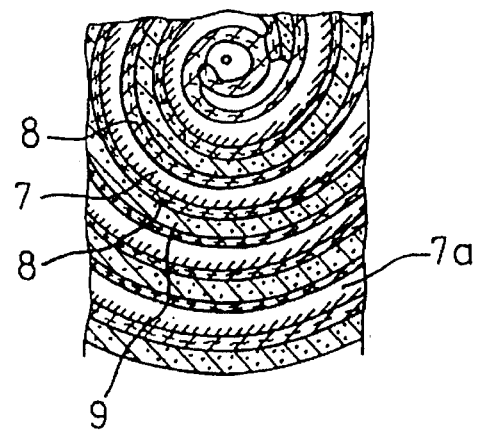
FIG. 4 is a cross-sectional view showing a spirally rolled-up electrode group of an example in accordance with the present invention.

FIG. 3 shows the state of the battery A, wherein a part of the battery housing 10 is cut out, and the electrode plates 7 and 9 and the separator 8 are extracted therefrom for illustration. FIG. 4 is an enlarged view showing a cross-section of the electrode group.

In these figures, the electrode group configured by rolling up the positive electrode 7, the separator 8 and the negative electrode 9 in spiral fashion is enclosed in the battery housing 10 made of nickel-plated steel having an insulating disk 15 on its inner bottom. Although omitted from the illustration for avoiding complexity, a lead conductor of the negative electrode 9 is welded to the housing 10. An open end of the housing is sealed by roll-caulking a peripheral edge of the open end gas-tightly and liquid-tightly with a sealing disk 11 and an insulating ring 12. A safety valve which actuates when a battery inner pressure exceeds a predetermined value is provided on the sealing disk 11. The safety valve is configured with a vent hole (not shown) provided on the sealing disk 11, a rubber valve member 13 which closes the vent hole, and a cap 14 for retaining the rubber valve member 13. A lead conductor of the positive electrode 7 is welded to the sealing disk 11.

In this electrode group, the side of the positive electrode 7 connected to the lower porosity layer 7a of the porous metal substrate 1 faces inward, in other words, the layer is directed toward the center of the electrode group.

Figure 2:
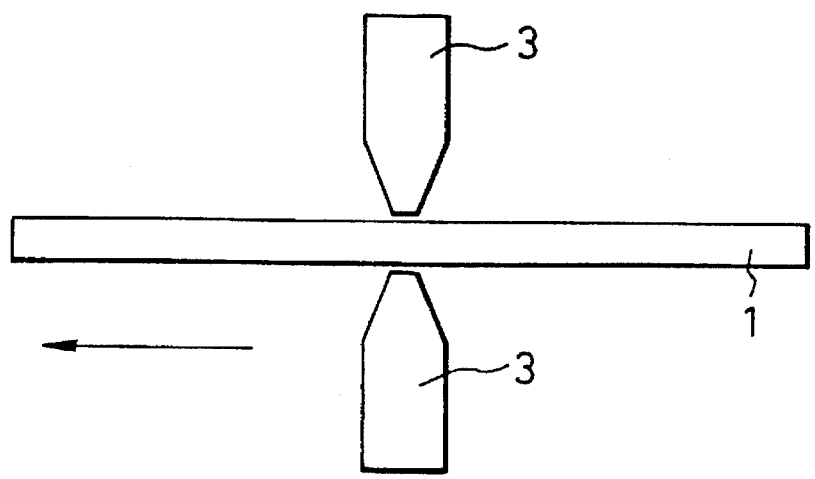
FIG. 2 is a schematic perspective view showing a process for fabricating an electrode of a conventional example.

For comparison, Battery B was configured, generally following the above procedure except for the use of a nickel electrode "b" produced by a conventional paste-spraying process wherein a foamed nickel porous substrate 1 was filled with the active material by using two nozzles 3,3 placed on both sides of the moving porous substrate as shown in FIG. 2, and by spot-welding the lead conductor at a predetermined position after it is cut into the same size as that of the electrode "a".

Figure 5:
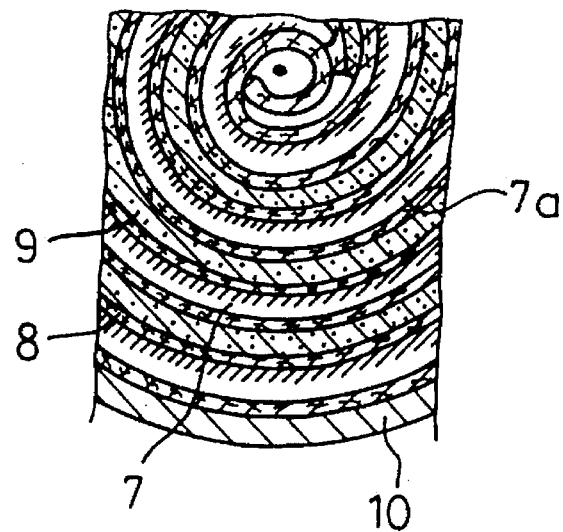
FIG. 5 is a cross-sectional view showing a spirally rolled-up electrode group of another example in accordance with the present invention.

Battery C was also configured, generally following the above procedure as that of Battery A, except for the mode of rolling up of the electrode group; the side of the positive electrode 7 connected to the lower porosity layer 7a of the porous metal substrate 1 faces outward, in other words, the lower porosity layer is directed to the outer periphery of the electrode group as shown in FIG. 5.

Each 100 cells of Batteries A, B and C were investigated with respect to the average values of utilization rate by measuring their discharge capacities at 0.2C discharging. Their discharge capacities at 1C discharging were also measured to investigate the average values of the discharge capacity rate, i.e., the ratio of the discharge capacity at 1C discharging to that at 0.2C discharging. The results of the measurements are summarized in Table 1 below.

TABLE 1

|  | Utilization rate of the positive electrode | Discharge capacity rate |
| --- | --- | --- |
| Battery A | 98.5% | 94.0% |
| Battery B | 93.5% | 91.0% |
| Battery C | 99.9% | 95.5% |

As clearly shown in Table 1, Batteries A and C in accordance with the present invention have an excellent utilization rate of the positive electrode and a discharge capacity rate, compared with Battery B of the comparative example.

With respect to Battery A, the positive electrode 7 is rolled up in spiral fashion while arranging the positive electrode 7 so that the lower porosity layer 7a, where no active material is filled, faces inward. Thus, the opposite side of the positive electrode 7, where the active material is filled, faces the negative electrode plate 9 which in part is disposed to the outermost periphery of the electrode group and in contact with the battery housing. The reactivity of the positive electrode 7 with the negative electrode 9 opposed thereto is improved and further the conductivity increases by the lower porosity layer 7a of the porous metal substrate. As a result, the utilization rate and the discharge capacity rate of Battery A are improved compared with those of Battery B which has the positive electrode filled with the active material in its communicating spaces on both faces.

In Battery C, wherein the electrodes are rolled up in spiral fashion by arranging the lower porosity layer 7a of the porous metal substrate faces outward, the conductivity as the electrode is also improved by the conductive face caused by the lower porosity layer 7a. As a result, the utilization rate and the discharge capacity rate increase, compared with those of Battery B.

EXAMPLE 2

Figure 6:
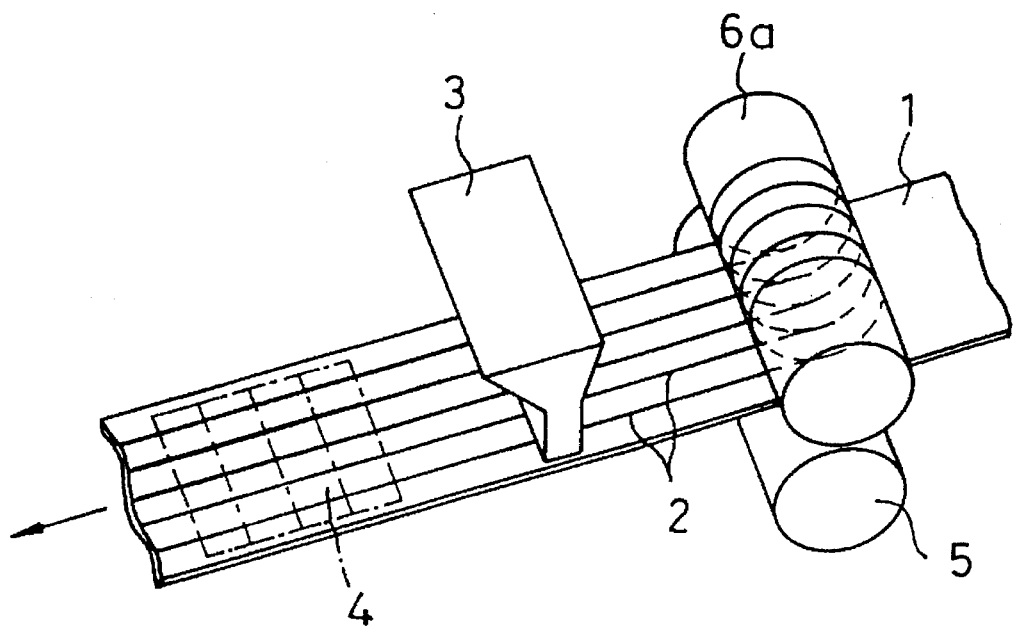
FIG. 6 is a schematic perspective view showing anther process for fabricating an electrode in accordance with the present invention.

A procedure similar to that in Example 1 was generally followed and the same prescription of the paste as that of Example 1 was adopted for producing a nickel electrode. A plurality of grooves 2 were provided on one face (top side) of the belt-like foamed nickel porous substrate along its lengthwise direction by transferring the substrate between a ribbed roller 6a provided on one face (top side) of the substrate and a follower roller 5 provided on the other face (bottom side) of the substrate, respectively, and by pressing the substrate 1 with both rollers from both sides. Then, in the same manner as that in Example 1, the paste was allowed to spout out through the nozzle 3 onto one face (top side) of the porous metal substrate 1 to be filled into the spaces of the substrate 1. Except for the above-mentioned additional procedure shown by FIG. 6, an electrode was produced in the same manner as that in Example 1. This was named electrode "d" in accordance with the present invention.

Figure 7:
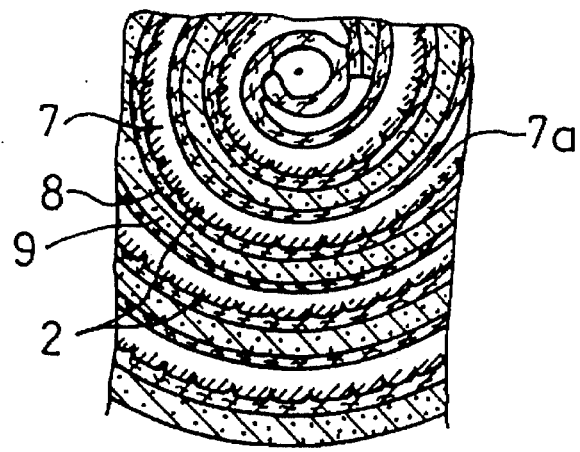
FIG. 7 is a cross-sectional view showing a spirally rolled-up electrode group of still another example in accordance with the present invention.

An electrode group was assembled by spirally rolling up the electrode "d" produced in the above-mentioned manner as the positive electrode, a known nonwoven fabric separator of polypropylene and a known metal hydride negative electrode of a hydrogen storage alloy comprising misch metal and nickel, interposing the separator between both electrodes and placing the positive electrode "d" so that the side provided with the grooves 2 faces outward as shown in FIG. 7. Then, a cylindrical battery (Battery D) was configured with this electrode group in a manner similar to that in Example 1.

For comparison, the above-mentioned Battery B was also used in this example. For each 100 cells of Batteries B and D, the utilization rate of the positive electrode and the discharge capacity rate were measured. The results of the measurements are summarized in Table 2 below.

TABLE 2

|  | Utilization rate of the positive electrode | Discharge capacity rate |
| --- | --- | --- |
| Battery B | 93.5% | 91.0% |
| Battery D | 96.5% | 93.0% |

As clearly shown in Table 2, Battery D in accordance with the present invention has improved utilization rate and discharge capacity rate, compared with Battery B of the comparative example.

The improvement in Battery D is caused by the configuration of its electrode group, because the positive electrode is rolled up together with the negative electrode and the separator in spiral fashion so that one face without filling of the active material faces inward, and the grooves 2 are provided in perpendicular to the direction of rolling up of the electrodes so that the grooves 2 are directed toward the outer periphery. This configuration improves the conductivity of the positive electrode by the inner face with increased conductivity of the porous metal substrate and the substantial area for the electrode reaction.

EXAMPLE 3

Figure 8:
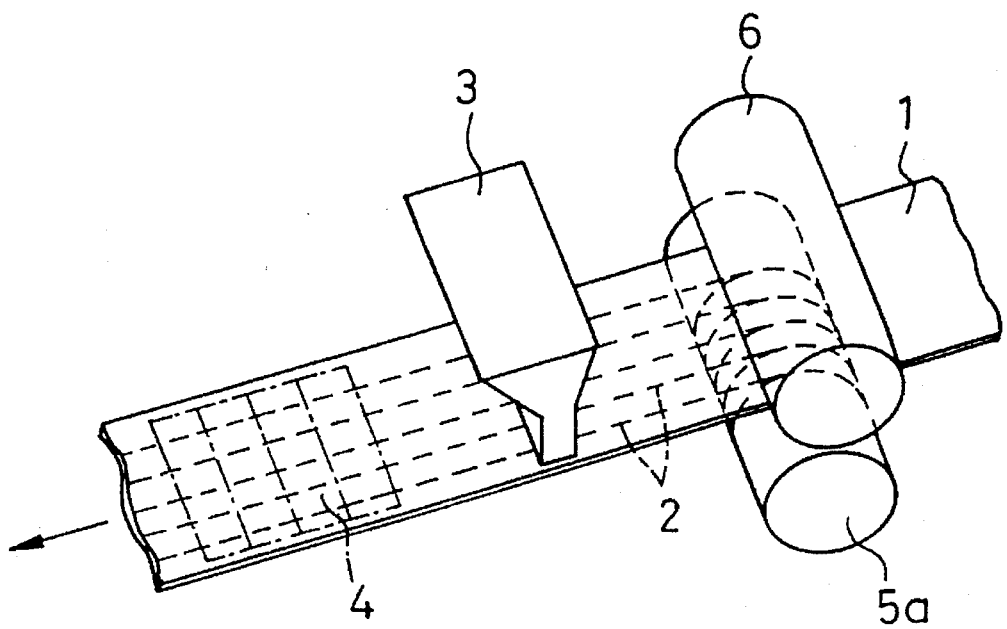
FIG. 8 is a schematic perspective view showing still another process for fabricating an electrode in accordance with the present invention.

A procedure similar to that in Example 1 was generally followed and the same prescription of the paste as that of Example 1 was adopted for producing another nickel electrode. A plurality of grooves 2 were provided on one face (bottom side) of the belt-like foamed nickel porous substrate along its lengthwise direction, by transferring the belt-like foamed nickel substrate between a ribbed roller 5a provided on one face (bottom side) of the substrate and a follower roller 6 provided on the other face (top side) of the substrate, respectively, and by pressing the substrate 1 with both rollers from both sides. Then, in the same manner as that in Example 1, the paste was allowed to spout out through the nozzle 3 onto one face (top side) of the porous substrate 1 to be filled into the spaces of the substrate 1. Except for the above-mentioned additional procedure shown in FIG. 8, an electrode was produced in the same manner as that in Example 1. This was named electrode "e" in accordance with the present invention.

Figure 9:
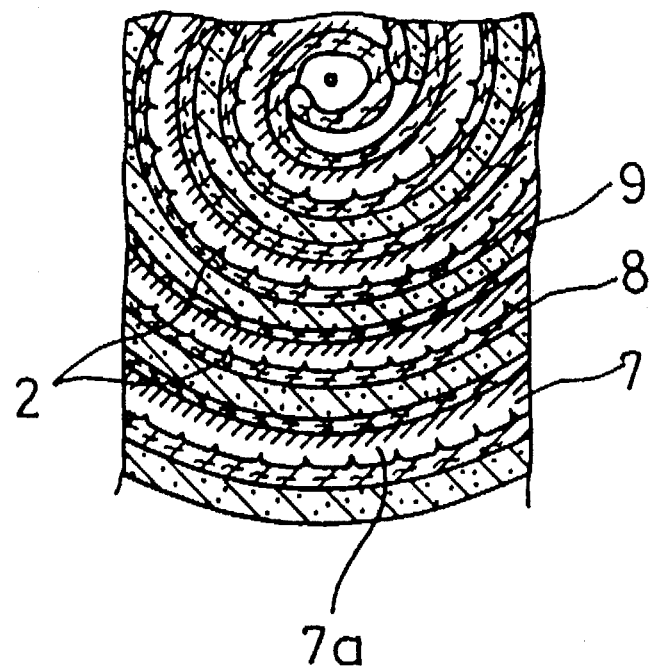
FIG. 9 is a cross-sectional view showing a spirally rolled-up electrode group of still another example in accordance with the present invention.

An electrode group was assembled by spirally rolling up the electrode "e" produced in the above-mentioned manner as the positive electrode, a known separator and a known metal hydride negative electrode of a hydrogen storage alloy comprising misch metal and nickel, interposing a separator between both electrodes and placing the positive electrode "e" so that the side provided with the grooves 2 faces outward as shown in FIG. 9. Then, a cylindrical battery (Battery E) was configured with this electrode group in a manner similar to that in Example 1. For each 100 cells of Battery E and Battery B of the comparative sample, the utilization rate of the positive electrode and the discharge capacity rate were measured. The results of the measurements are summarized in Table 3 below.

TABLE 3

|  | Utilization rate of the positive electrode | Discharge capacity rate |
| --- | --- | --- |
| Battery B | 93.5% | 91.0% |
| Battery E | 97.0% | 93.5% |

As clearly shown in Table 3, Battery E in accordance with the present invention has improved utilization rate and discharge capacity rate, compared with Battery B of the comparative example.

The improvement in Battery E is caused by the configuration of its electrode group, because the positive electrode is rolled up together with the negative electrode and the separator in spiral fashion so that one face without filling of active material faces outward, and the grooves 2 are provided in perpendicular to the direction of rolling up of the electrodes. In the assembled electrode group, since cracks were produced along the grooves 2 regularly the cylindrical electrode group could have a cross-section of preferable true circle. This configuration improves the conductivity of the positive electrode by the outer face with increased conductivity of the porous metal substrate and the efficiency of the reactivity with the negative electrode.

In the previous examples, the descriptions are limited to the use of the foamed nickel as the porous metal substrate, it is needless to say that the technical advantages similar to those with the foamed nickel can also be obtained if a nonwoven fabric of nickel fibers and a sintered plaque of nickel powder without skeletal structure are employed for fabricating the electrode, as far as these substrates have the three-dimensional communicating spaces.

As previously described, if the electrode in accordance with the present invention is employed, it is possible to provide a cylindrical storage battery having a high utilization rate and a high discharge capacity rate.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A cylindrical battery provided with an electrode group configured by rolling up two sheet electrodes of opposite polarity in spiral fashion interposing a separator therebetween, wherein at least one of said electrodes comprises:
   (a) a sheet of porous metal substrate having three-dimensional communicating spaces for including an active material defined by a first principal face and a second principal face which faces inward when the electrode group is rolled up, wherein said substrate has a higher porosity layer connected to said first principal face, and a lower porosity layer connected to said second principal face, having a smaller thickness than that of said higher porosity layer, and
   (b) the active material filled substantially in said spaces of said higher porosity layer.

2. A cylindrical battery provided with an electrode group configured by rolling up two sheet electrodes of opposite polarity in spiral fashion interposing a separator therebetween, wherein at least one of said electrodes comprises:
   (a) a sheet of porous metal substrate having three-dimensional communicating spaces for including an active material defined by a first principal face and a second principal face which faces outward when the electrode group is rolled up, wherein said substrate has a higher porosity layer connected to said first principal face, and a lower porosity layer connected to said second principal face, having a smaller thickness than that of said higher porosity layer, and
   (b) the active material filled substantially in said spaces of said higher porosity layer.

3. The cylindrical battery in accordance with claim 1, wherein one of said electrodes is provided, on said second principal face, with a plurality of grooves or cut-lines which are parallel with an axis of the rolling-up.

4. The cylindrical battery in accordance with claim 2, wherein one of said electrodes is provided, on said second principal face, with a plurality of grooves or cut-lines which are parallel with an axis of the rolling-up.

5. The cylindrical battery in accordance with claim 1, wherein one of said electrodes is provided, on said first principal face, with a plurality of grooves or cut-lines which are parallel with an axis of the rolled-up electrode group.

6. The cylindrical battery in accordance with claim 2, wherein one of said electrodes is provided, on said first principal face, with a plurality of grooves or cut-lines which are parallel with an axis of the rolled-up electrode group.

7. The cylindrical battery in accordance with claim 1, wherein the porous metal substrate of said one of the electrodes is foamed nickel and said active material is nickel hydroxide.

8. The cylindrical battery in accordance with claim 2, wherein the porous metal substrate of said one of the electrodes is foamed nickel and said active material is nickel hydroxide.

9. The cylindrical battery in accordance with claim 7, wherein other one of the electrodes comprises a porous substrate and a hydrogen storage alloy powder supported by said porous substrate.

10. The cylindrical battery in accordance with claim 8, wherein other one of the electrodes comprises a porous substrate and a hydrogen storage alloy powder supported by said porous substrate.

* * * * *